United States Patent

Sosinski

[11] 3,978,761
[45] Sept. 7, 1976

[54] FASTENER ASSEMBLY

[75] Inventor: Charles W. Sosinski, Linden, N.J.

[73] Assignee: Thomas & Betts Corporation, Elizabeth, N.J.

[22] Filed: June 26, 1975

[21] Appl. No.: 590,629

[52] U.S. Cl. ................................ 85/61; 151/37; 151/38; 206/338

[51] Int. Cl.² ..................................... F16B 31/02

[58] Field of Search ..................... 85/61, 35, 53–55, 85/62; 151/37, 38, 36; 339/263 R, 263 L, 263 B, 116 R, 116 C; 206/338, 230

[56] References Cited
UNITED STATES PATENTS

| 1,381,587 | 6/1921 | Noble | 85/35 |
| 1,394,740 | 10/1921 | Klocke | 151/37 X |
| 2,097,713 | 11/1937 | Ashley | 151/38 |
| 2,551,834 | 5/1951 | Ferguson | 85/35 X |
| 2,771,591 | 11/1956 | Vordtriede | 151/38 |
| 3,548,704 | 12/1970 | Kutryk | 85/35 X |
| 3,742,583 | 7/1973 | Devlin et al. | 85/61 X |
| 3,800,396 | 4/1974 | Puchner | 151/37 X |

FOREIGN PATENTS OR APPLICATIONS

| 636,531 | 3/1962 | Italy | 85/35 |
| 953,009 | 3/1964 | United Kingdom | 85/54 |

Primary Examiner—Ramon S. Britts
Assistant Examiner—Rodney H. Bonck
Attorney, Agent, or Firm—David Teschner; Jesse Woldman

[57] ABSTRACT

A fastener assembly comprising in overlying, stacked relationship a flat washer, an elastically deformable washer and a nut all enclosed in a shroud which assures all components of the assembly are used and in their proper order. The shroud is fashioned with a retaining lip at one end which, as the assembly is tightened, causes the shroud to retreat from the assembly to prevent its retention between the flat washer and the surface about the threaded stud to which the assembly is fastened. By the inclusion of an additional lip the retention of the shroud, after the torque limiting device coupled to the nut has been removed, can be assured.

4 Claims, 8 Drawing Figures

FASTENER ASSEMBLY

BACKGROUND OF THE INVENTION

1. Field of the Invention

The invention finds utility in the coupling together of two members which must be joined at a prescribed torque and in such a manner as to retain as much as possible the installation torque thereafter. The invention is particularly useful in the bolting together of connectors and bus bars where a proper torque level is necessary to provide a proper electrical joint initially and where the proper torque level must be maintained to insure a proper electrical contact thereafter during use.

2. Description of the Prior Art

In the prior art, in order to properly bolt a connector to a bus bar where the connector and bus bar are of dissimilar metals, an elastically deformable washer such as a Belleville washer and a nut were employed. The nut was tightened in the threaded stud of the bus bar using a torque wrench. The Belleville washer provided compensation for different expansion and cooling rates for the bolt, nut, bus bar and connector. However, the sharp edges of the washer tended to cause cold flow of the aluminum away from the washer and interfere with the connection. To better distribute the forces of the Belleville washer a flat washer was placed between the connector and the Belleville washer. This improved the matter except that the installer had to remember to carry all three pieces, install them in proper sequence and have a torque wrench so that he could properly tighten up the stack. Further, an inspector checking the job would have to go up close to each joint to see if all elements were installed and in proper order.

SUMMARY OF THE INVENTION

The present invention overcomes the shortcomings of the prior art by providing a fastening assembly wherein each component required is present, is properly oriented, may be installed with simple, normally available tools and which can be inspected quickly and at a distance from the actual joint. This is accomplished by providing a fastener assembly comprising in overlying, stacked relationship a flat washer, an elastically deformable washer and a nut all enclosed in a shroud which assures all components of the assembly are present, in their correct order and properly oriented. The shroud is fashioned with a retaining lip at one end which serves to retain the flat washer and which is acted upon by the flat washer, as the assembly is tightened upon a threaded stud, to urge the end of the shroud outwardly to engage the periphery of the flat washer so that the lip will no longer bear on a surface of the flat washer and come between the flat washer and the material of the connector adjacent the threaded stud but will hold the flat washer so that the shroud is retained for visual inspection. By the inclusion of an additional lip, and the selective contouring of the shroud between the lip and additional lip, the shroud can be made to anchor securely to the nut and prevent unwanted separation of the shroud from the assembly.

Coupled to the nut is a drive means having wrench flats on its outer surface to permit same to be driven by a wrench or the like. The coupling between the drive means and nut is made frangible at a predetermined torque so that below such predetermined torque the torque applied to said drive means is directly transmitted to said nut to tighten the assembly upon a threaded stud. When the predetermined torque level is exceeded the frangible coupling breaks permitting the drive means to be removed from the nut and ending further tightening operations. Thus, by selecting the torque level at which the coupling fractures equal to the desired application torque for the connector, the need for a torque wrench is eliminated.

Further, the shroud is retained by the frictional engagement between the lip and the periphery of the flat washer, but may be removed if so desired. If removal is not desired, except by destroying the shroud, the second type of shroud with an additional lip is used which can only be removed by destruction of the shroud. The inspector can then tell at a glance that all components of the fastener assembly are present, in correct order and orientation. By checking for the presence of the drive means he can also tell if the assembly was installed with the proper torque. It is therefore an object of this invention to provide a novel fastener assembly.

It is another object of this invention to provide a multi-component fastener wherein all the components are held as a single unit and are arranged in desired order and orientation.

It is still another object of the invention to provide a fastener assembly which can be inspected from a distance.

It is still another object of the invention to provide a fastener assembly which can be installed with commonly available tools.

It is another object of the invention to provide a multi-component fastener the integrity of which can be determined by remote visual inspection.

It is yet another object of this invention to provide a fastener assembly having a flat washer, an elastically deformable washer and a nut unified in a shroud to properly present the components of said assembly to a threaded stud used to make an electrical joint.

Other objects and features of the invention will be pointed out in the following description and claims and illustrated in the accompanying drawings, which disclose, by way of example, the principles of the invention and the best modes which have been contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
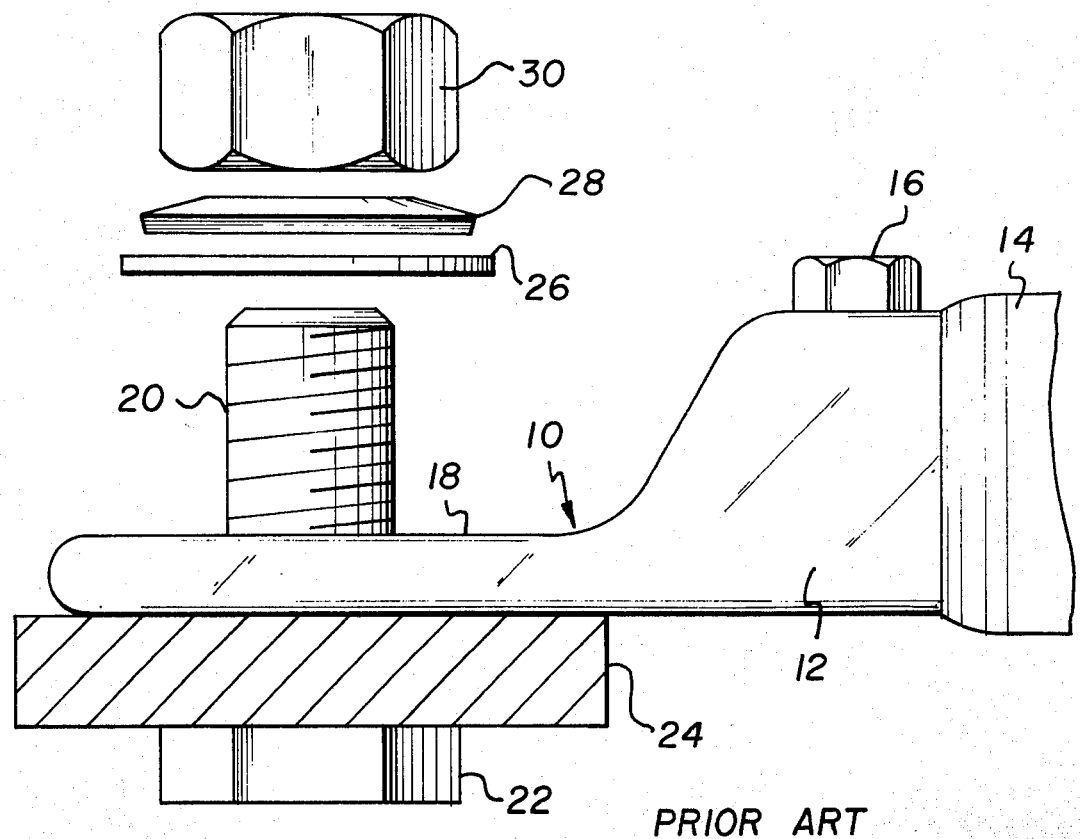
FIG. 1 is an exploded side elevation of the component portions of a connection between a conductor and a bus bar according to the prior art.
Figure 2:
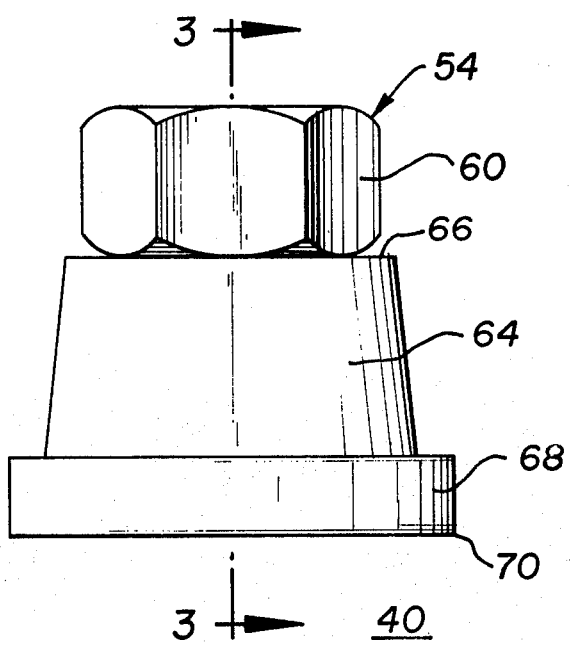
FIG. 2 is a side elevational view of a first embodiment of a fastener assembly constructed in accordance with the concepts of the invention.
Figure 3:
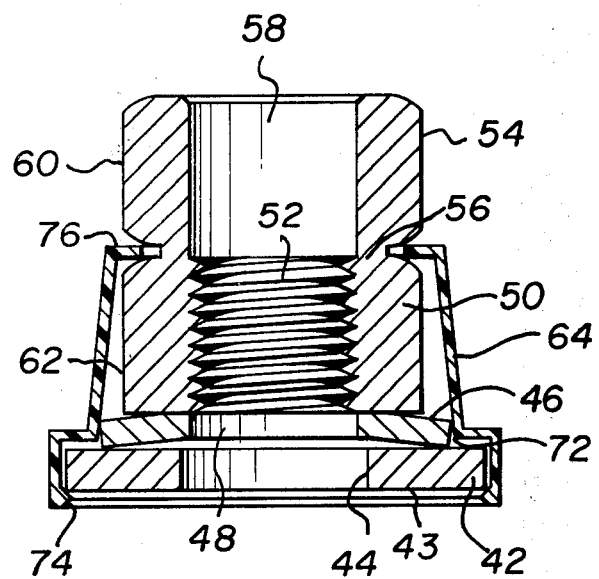
FIG. 3 is a front elevational view in section taken along the line 3—3 of FIG. 2.

Turning now to FIG. 1 a joint constructed in accordance with usual prior art techniques is shown. A connector 10 has a wire band 12 into which the bared end of an electrical conductor 14 is inserted and to which it is joined by the bolt 16. The connector 10 has a pad 18 having one or more apertures therethrough each capable of accepting a threaded stud 20. The studs 20 may be of any desired length and diameter and terminate at one end in a head 22. A bus bar 24, to be coupled to connector 10, will have apertures therethrough in the same pattern as the pad 18. One or more studs 20 are passed through the apertures in the bus bar 24, the corresponding apertures in the pad 18 of connector 10 and then receive in order a flat washer 26, an elastically deformable washer 28 and a nut 30.

With this arrangement it is necessary for the installer to have the three components, have them in the correct size and install them in the correct order and with the correct orientation. For example, if the washer 28 were inverted it would operate about the same as a flat washer and would generally loose its ability to compensate for joint expansion and contraction. Omission of the flat washer would cause the cold flow problems set forth above and reversal of the order of the flat washer and elastically deformable washer would have the same result. Finally, it was necessary that a torque wrench be available if a correct torque level was to be applied to the joint.

Referring to FIGS. 2, 3, 4, 5 and 6, a fastener assembly 40 constructed in accordance with a first embodiment of the instant invention is shown. Fastener assembly 40 comprises a flat washer 42 (see FIG. 3) having a passage 44 therethrough, an elastically deformable washer or Belleville washer 46 having a passage 48 therethrough, a nut 50 having a threaded passage 52 therethrough and a drive means 54 coupled to said nut 50 by means of a frangible coupling 56 said drive means 54 having a passage 58 therethrough. The passages 44, 48, and 58 are aligned with the threaded passage 52 and are of diameters greater than the largest root diameter of the threaded passage 52 so as to freely move over a thread stud engageable with threaded passage 52.

The coupling 56, between nut 50 and drive means 54, is made frangible by controlling the thickness thereof so when the torque applied to drive means 54 by a tool (not shown) exceeds a predetermined value the coupling 56 will shear allowing the drive means 54 to be separated from the nut 50. A series of wrench flats 60 are placed on the periphery of drive means 54 to permit the engagement of said drive means by an appropriate wrench, socket or the like. Similarly, nut 50 has a series of wrench flats 62 about its periphery to permit the nut 50 to be removed by such wrench or socket or the like.

Encompassing the washer 42, washer 44 and nut 50 is a shroud 64 having a first end 66 intermediate the interspace between nut 50 and drive means 54 and generally opening outwardly to an annular ring 68 adjacent the second end 70. As is evident in FIG. 3, the passage within annular ring 68 is large enough to accept the flat washer 42 and the transition between the passage within annular ring 68 and the passage in the remainder of the shroud 64 provides a shoulder 72 to limit the movement of flat washer 42 in the direction of nut 50. Also, the overall inner diameter of ring 68 is chosen to properly position flat washer 42 and Belleville washer 46 in correct axial position with respect to nut 50. The height of the ring 68, as well as the inner diameter at rib 74 (to be discussed below) prevents the Belleville washer 46 and the flat washer 42 being reversed. An annular rib 74, adjacent the second end 70 of the shroud, engages one face 43 of the flat washer 42 and holds the washer 42 loosely in place. The flat washer 42 is thus free to move in the space between annular rib 74 and shoulder 72. As a result of the fixing of the position of the flat washer 42, the position of the Belleville washer 46 in a direction towards shroud end 70 is fixed. The inturned annular collar 76 at the first end 66 of shroud 64 generally bears on the nut 50 and thus the position of nut 50 with respect to the shroud 64 is generally fixed. The collar 76 may have a series of radial score lines (not shown) to make collar 76 more resilient and assist in assembling the shroud 64 over the drive means 54.

Figure 4:
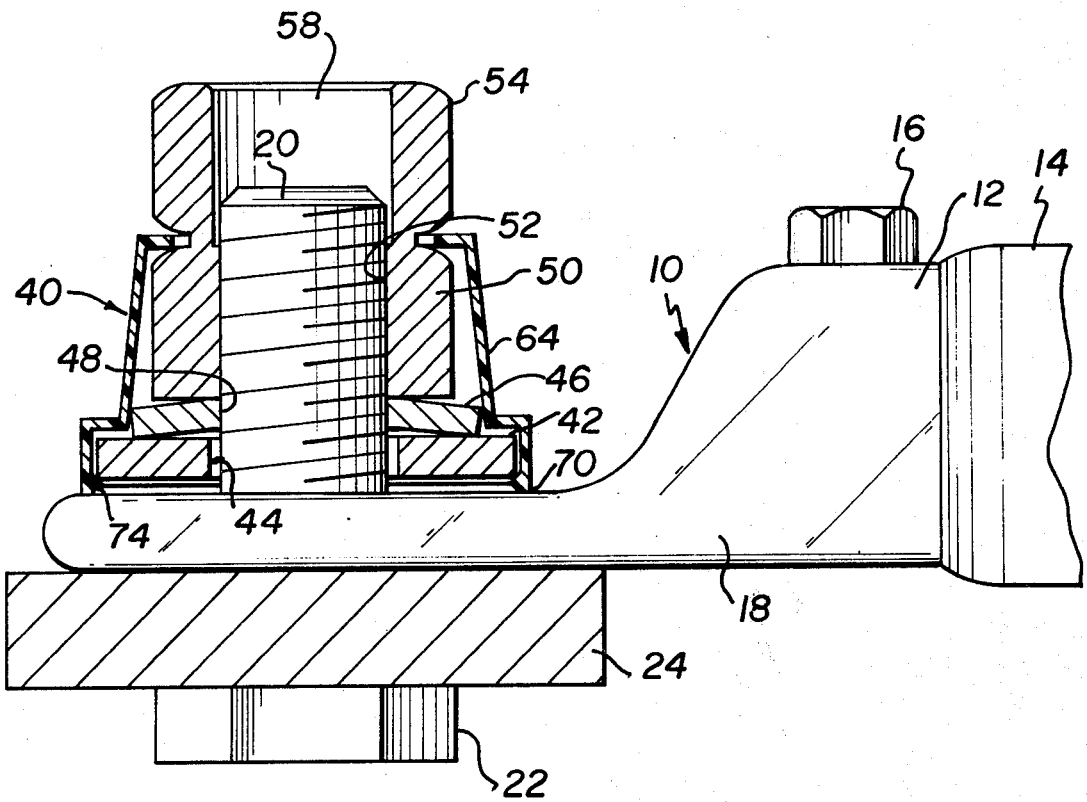
FIG. 4 is a side elevational view, in section, of the fastener assembly of FIG. 2 initially installed on a threaded stud used to join a bus bar and a connector.

Turning now particularly to FIG. 4, the positions of the various components of the fastener assembly 40 when initially applied to a threaded stud 20 are shown. The thread stud 20 passes through the passages 44 and 48 in washer 42 and Belleville washer 46 respectively and engages threaded aperture 52 in nut 50. The excess of stud 20 passes into passage 58 in drive means 54. The assembly 40 has been hand tightened upon threaded stud 20 until the second end 70 of shroud 64 comes to rest on the top surface of pad 18 of connector 10. At this point, a tool such as a wrench (not shown) is made to engage the wrench flats 60 of drive means 54 and the fastening assembly is further tightened upon threaded stud 20. The torque applied to drive means 54 is transmitted via coupling 56 to nut 50 to Belleville washer 46. Based upon the stiffness of the Belleville washer 46 and its configuration some of the applied torque will result in a flattening of the Belleville washer 46 and some will be transmitted to flat washer 42. Flat washer 42 will, in turn, bear against annular rib 74. Since the end 70 of shroud 64 is firmly against pad 18 of connector 10 and cannot move downwardly towards bus bar 24, the downward force on the annular rib 74 is converted to a radially outward force away from threaded stud 20 permitting the face 43 of flat washer 42 to advance into contact with pad 18 of connector 10 as is clearly shown in FIG. 5. The shroud 64, because of its restriction between the drive means 54 and nut 50 at end 66 and pad 18 at end 70 is caused to bow as at 78. The Belleville washer 46 tends to flatten out but is not compressed to a complete flat so that it can compensate for variations of metal expansion during heating and cooling cycles.

Figure 5:
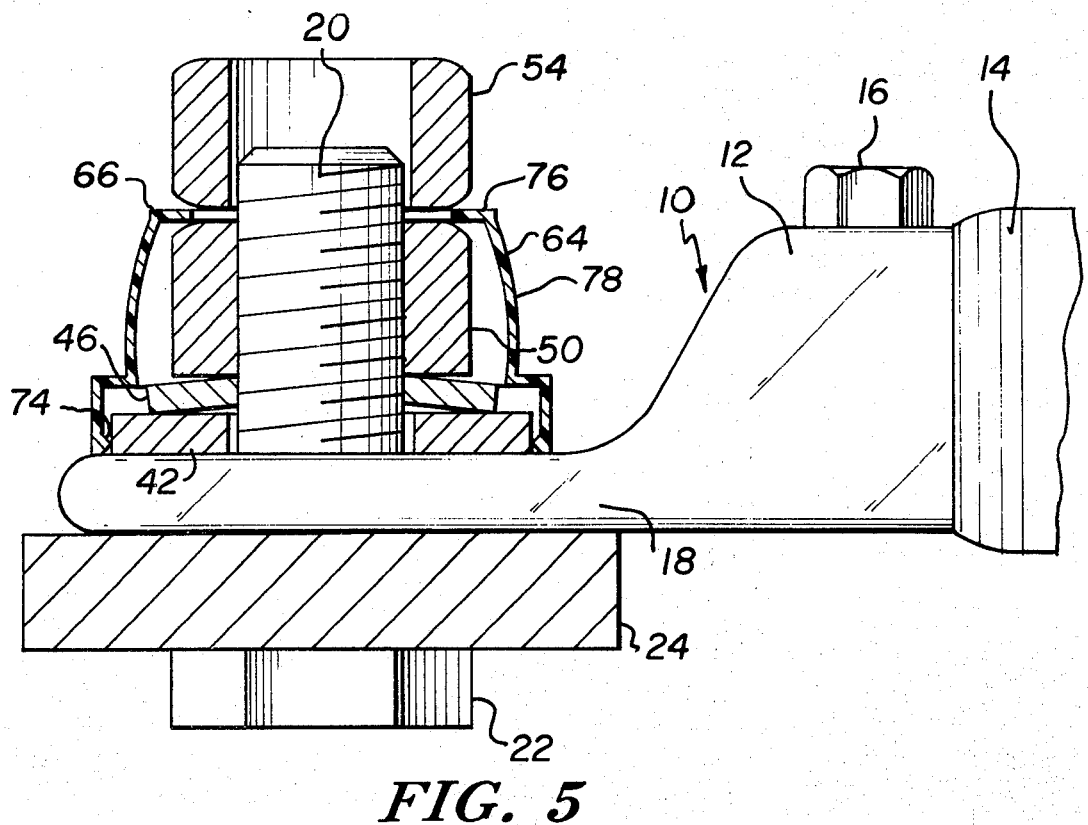
FIG. 5 is the same view as FIG. 4 but showing the fastener assembly fully tightened to the threaded stud.
Figure 6:
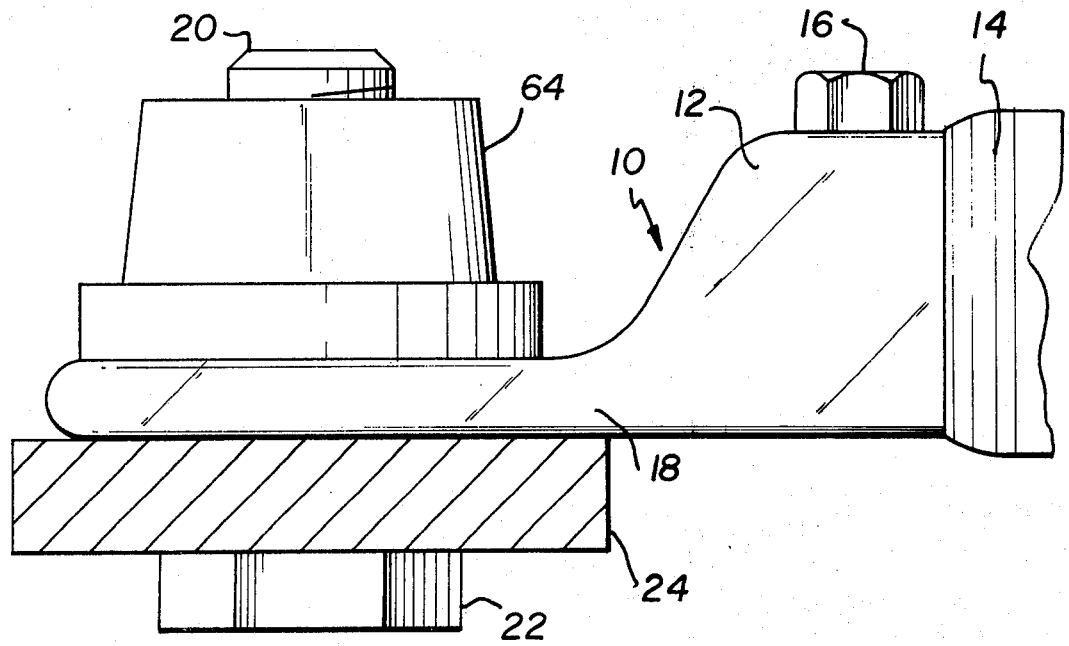
FIG. 6 is a side elevational view of the completed joint with the fastener assembly installed.

At about the time that the fastener assembly 40 arrives at the state shown by FIG. 5, the applied torque will reach the predetermined level and the coupling 56 between driver means 56 and nut 50 will shear and the driver means 56 will be removed. The shroud 64 will be retained by the frictional engagement between the annular rib 74 and the outer periphery of flat washer 42 and the overall joint will appear as shown in FIG. 6. An inspector can now look at the joint, even from a distance, and see, because of the presence of shroud 64, that the proper components in proper order and orientation were installed at the joint. Also, by seeing that the drive means 54 was removed that the fastener assembly 40 had been applied at the correct torque. The shroud 64 and drive means 54 can also be colored to make inspection simpler.

Figure 7:
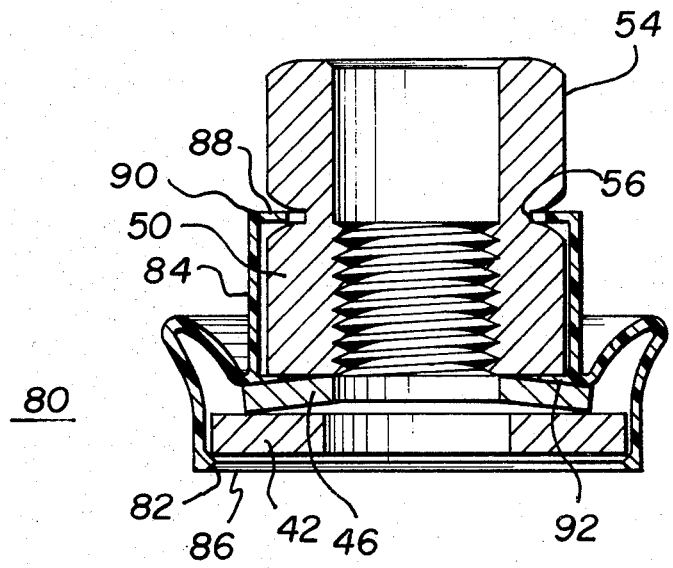
FIG. 7 is a front elevational view, in section of a further embodiment of a fastener assembly constructed in accordance with the concepts of the invention.

Under some conditions, as where the joint is subject to many heat cycles and is exposed to the elements, the frictional engagement between the rib 74 and the outer periphery of flat washer 42 may not be sufficient to retain the shroud 64. To permit the shroud to be retained over the useful life of the joint, a further fastener assembly 80, as is shown in FIG. 7, is employed. The flat washer 42 is present, as is the Belleville washer 46, the nut 50 and drive means 54 coupled to nut 50 by a frangible coupling 56. The shroud 84 has a first annular rib 82 adjacent its second end 86 to retain flat washer 42 and be acted upon by flat washer 42 as the fastener assembly 84 is tightened upon a threaded stud 20 as was described above with respect to annular rib 74. The shroud 84 further has an annular collar 88 at its first end 90 which extends into the interspace between the nut 50 and drive means 54 adjacent coupling 56.

Figure 8:
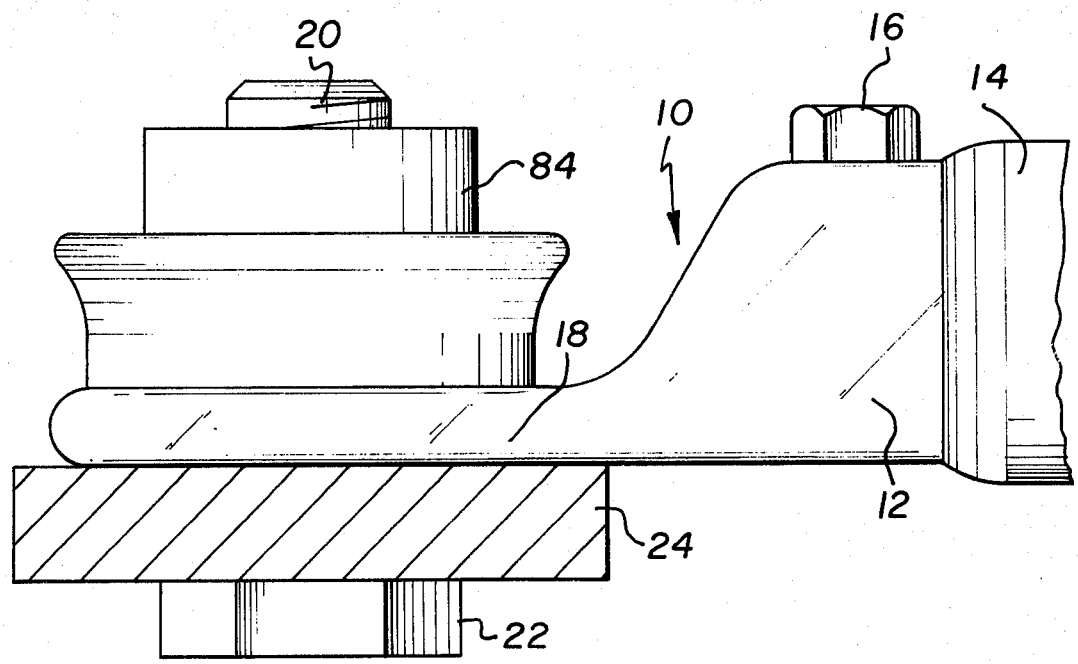
FIG. 8 is a side elevational view of the completed joint with the fastener assembly shroud retained.

An additional annular rib 92 is provided and positioned to enter the interspace between the nut 50 and the Belleville washer 46. The shroud 84, between the annular collar 88 and the additional annular rib 92 is made cylindrical so that the shroud 84 in this region conforms closely to the nut 50. The shroud 84, between additional annular rib 92 and the annular rib 82, is bowed so that as the assembly 80 is tightened and the shroud 84 in the region of second end 86 retreats from the flat washer 42, the shroud 84 is able to further bow in this area without causing the additional annular rib 92 to be withdrawn from its position, as shown in FIG. 7. The effective capture of nut 50 by the shroud 84 assures that the shroud 84 will not separate from the assembly unless it is destroyed. This makes periodic inspection after installation simple. The final assembled joint is shown in FIG. 8. Also, by color coding the main shroud body and the area of the shroud under the drive means 54 contrasting colors the absence of the drive means and the proper installation of the fastener assembly can be readily determined by remote visual inspection.

While there have been shown and described and pointed out the fundamental novel features of the invention as applied to the preferred embodiments, it will be understood that various omissions and substitutions and changes of the form and details of the devices illustrated and in its operation may be made by those skilled in the art, without departing from the spirit of the invention.

The embodiments of the invention in which an exclusive property or privilege is claimed are defined as follows:

1. A fastener assembly comprising: a flat washer having a first face arranged to be placed adjacent the surface about a threaded stud, a second face and a passage therethrough from said first face to said second face; an elastically deformable washer at least partially overlying said second face of said flat washer having a passage therethrough communicating with said passage of said flat washer; a nut at least partially overlying said elastically deformable washer having a threaded passage therethrough communicating with said passage in said elastically deformable washer; drive means coupled to and spaced apart from said nut; said drive means having a passage therethrough communicating with said passage of said nut; a shroud having a first end extending into the interspace between said nut and said drive means and a second end adjacent said first face of said flat washer; said shroud also having an exterior surface and an interior surface; and an annular ring on said interior surface adjacent said second end, said annular ring having an upper inclined surface in contact with the edge of said flat washer first face to hold said nut, said elastically deformable washer and said flat washer in assembly and as said nut is tightened on a threaded stud to cause said shroud second end to be enlarged and remove said annular ring from said edge of said first face and engage the outer periphery of said flat washer to permit said first face of said flat washer to engage the surface about the threaded stud upon which said nut is tightened.

2. A fastener assembly as defined in claim 1, wherein said shroud has a lip on the interior surface thereof intermediate said first and said second ends extending into the interspace between said elastically deformable washer and said nut to capture said nut between said first end of said shroud and said lip thereof.

3. A fastener assembly as defined in claim, 2 wherein said shroud, between said annular ring and lip is contoured to cause said lip to further seat itself in the interspace between said nut and said elastically deformable washer as the edge of said first face of said flat washer causes said shroud second end to be enlarged and remove said annular ring from said edge of said first face.

4. A fastener assembly as defined in claim 1 wherein said drive means outer surface is contoured to receive a tool thereon for turning said fastener assembly onto a threaded stud and said coupling between said drive means and said nut is so proportioned that when more than a predetermined amount of torque is applied by a tool to said drive means said coupling fractures and permits the separation of said drive means from said nut and permits the removal of said shroud indicating the proper tightening of said fastener assembly upon a threaded stud.

* * * * *